United States Patent
Takahashi et al.

(10) Patent No.: US 6,648,400 B2
(45) Date of Patent: Nov. 18, 2003

(54) REAR VEHICLE BODY STRUCTURE FOR PICKUP TRUCKS

(75) Inventors: Yasushi Takahashi, Tokyo (JP); Tomonori Ootsuka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/322,385

(22) Filed: Dec. 18, 2002

(65) Prior Publication Data

US 2003/0111868 A1 Jun. 19, 2003

(30) Foreign Application Priority Data

Dec. 18, 2001 (JP) ........................................ 2001-384913

(51) Int. Cl.[7] .................................................. B60J 7/00
(52) U.S. Cl. ..................... 296/195; 296/198; 296/203.04
(58) Field of Search ................................. 296/195, 198, 296/203.04, 201, 204, 187.11, 187.12; 180/68.3, 297; 280/834; 141/348

(56) References Cited

U.S. PATENT DOCUMENTS

| | | | |
|---|---|---|---|
| 4,408,794 A | * 10/1983 | Harasaki | 296/198 |
| 4,723,811 A | * 2/1988 | Harasaki | 296/198 |
| 4,875,733 A | * 10/1989 | Chado et al. | 296/198 |
| 4,919,474 A | * 4/1990 | Adachi et al. | 296/198 |
| 4,950,025 A | * 8/1990 | Yoshii | 296/203.04 |
| 5,106,148 A | * 4/1992 | Ikeda et al. | 296/203.02 |
| 5,123,696 A | * 6/1992 | Watari | 296/201 |
| 5,174,628 A | * 12/1992 | Hayatsugu et al. | 296/204 |
| 5,251,712 A | * 10/1993 | Hayashi et al. | 180/68.3 |
| 5,267,772 A | * 12/1993 | Ohta et al. | 296/187.11 |
| 5,350,214 A | * 9/1994 | Yamauchi et al. | 296/198 |
| 5,472,063 A | * 12/1995 | Watanabe et al. | 180/297 |
| 5,478,098 A | * 12/1995 | Akagi et al. | 180/68.3 |
| 5,580,121 A | * 12/1996 | Dange et al. | 296/198 |
| 5,611,592 A | * 3/1997 | Satou et al. | 296/203.04 |
| 5,782,525 A | * 7/1998 | Honma et al. | 296/187.12 |
| 5,954,367 A | * 9/1999 | Doll et al. | 280/834 |
| 6,126,232 A | * 10/2000 | Nakano | 296/204 |
| 6,209,205 B1 | * 4/2001 | Rumpel et al. | 296/198 |
| 6,364,405 B1 | * 4/2002 | Kim | 296/203.04 |
| 6,408,903 B1 | * 6/2002 | Theuer et al. | 141/348 |

FOREIGN PATENT DOCUMENTS

| | | | |
|---|---|---|---|
| JP | 57 26053 | * | 2/1982 |
| JP | 2000 108941 | * | 4/2000 |
| JP | 2002 362420 | * | 12/2002 |

* cited by examiner

Primary Examiner—Kiran Patel
(74) Attorney, Agent, or Firm—Darby & Darby

(57) ABSTRACT

A pickup truck has a rear vehicle body structure in which a fuel piping system is guided through a rear wheel apron along a cargo bed of the vehicle. A reinforcing member is jointed to the rear wheel apron such as to cover a part of the apron at which a hose of the fuel piping system is led out onto the cargo bed. A lower end of the reinforcing member is bent toward the vehicle body center to form a flange. The rear wheel apron and the rear floor panel are jointed together, with a side edge of the rear floor panel being superposed on the flange of the reinforcing member. The linking strength between the rear wheel apron and the cargo bed of the vehicle is thereby increased without adding any major change in the body design. While the rigidity around the rear wheel apron is improved, the structure does not inhibit the vehicle body from being deformed in a rear impact collision and is capable of protecting the fuel piping system from the impact.

6 Claims, 4 Drawing Sheets

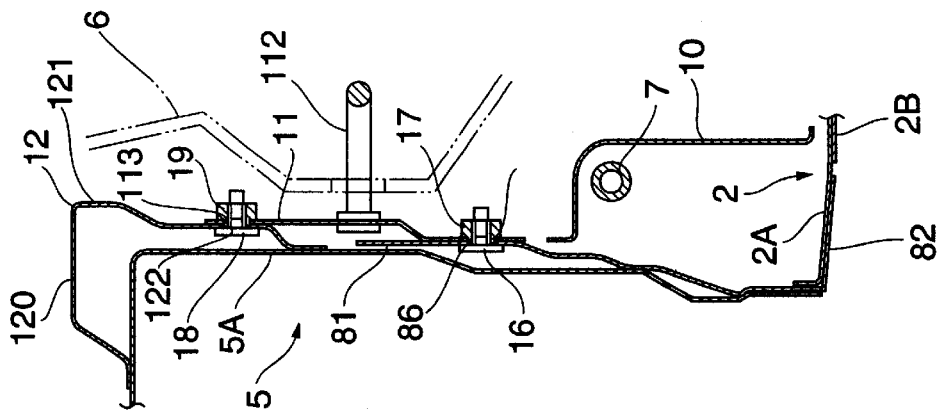
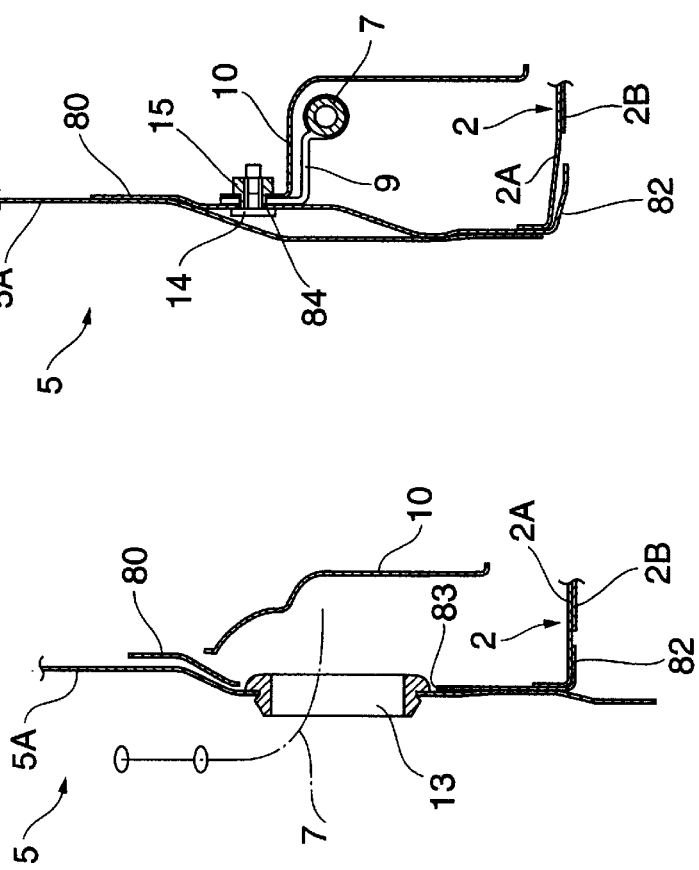

REAR VEHICLE BODY STRUCTURE FOR PICKUP TRUCKS

BACKGROUND OF THE INVENTION

The present invention relates to a rear vehicle body structure for pickup trucks, more particularly, to a rear vehicle body structure for pickup trucks based on a passenger car manufactured on the basis of cars.

The present application claims priority from Japanese Patent Application No. 2001-384913, the disclosure of which is incorporated herein by reference.

In response to the diversification of needs of consumers, car manufacturers have produced more and more pickup trucks based on a passenger car and sport utility vehicles (SUVs) based on a passenger car or a truck in recent years, as these vehicles offer both the practicality of trucks with a high cargo capacity and the comfort of passenger cars. The pickup trucks based on a passenger car (hereinafter referred to as "pick-ups") have a monocoque vehicle body similar to that of the passenger cars unlike recreational vehicles (RVs) which have a frame structure. Therefore, the pick-ups normally have the same structures for a rear wheel apron and a fuel piping system accommodated therein as the passenger car (hereinafter referred to as "car"), that is, the pick-ups take a form of a car-like vehicle without a roof of a luggage compartment thereof.

Since the pick-ups have no roof over their cargo bed in the rear vehicle body, the pick-ups are often provided with reinforcing guard bars in a front part of the cargo bed for securing enough rigidity of the open cargo bed. Even so, since priority is usually given to lower production cost and lighter weight of the vehicle, it is not always the case that sufficiently strong is the linking strength between the rear wheel apron and the rear floor panel making up the cargo bed. In that case, the pick-ups cannot have the same vehicle body rigidity as the cars on which the pick-ups are based, and the low rigidity around the rear wheel apron results in higher vibration and noise levels in comparison with the cars.

If the parts in and around the rear wheel apron have the low rigidity, they will readily deform along with the cargo bed in the event of a rear impact collision, and in some cases the rear impact collision may damage a part of the fuel piping system installed inside the rear wheel apron.

Another problem to be taken into account is that the pick-ups are likely to accommodate high or heavy cargo, and an anchoring hook or a member for dividing the cargo bed into upper and lower sections may be equipped in or placed on the rear wheel apron. Thus, the rear wheel apron parts need to be reinforced for this reason, too.

These problems could be addressed by increasing a plate thickness of the floor panel of the bed or by incorporating reinforcements for the rear wheel apron parts to improve the rigidity of the vehicle body. However, an increase in the rigidity of the entire vehicle against front and rear impact is undesirable because, if the cargo bed does not buckle in a rear impact collision, the impact load may cause much damage to the passengers since collision energy can not be absorbed by the cargo bed.

SUMMARY OF THE INVENTION

The present invention has been devised to resolve the problems encountered by a conventional rear vehicle body structure for pickup trucks. An object of the present invention is to provide a rear vehicle body structure for the pickup trucks, with which linking strength between a rear wheel apron and a rear floor panel is increased without adding any major change in the body design. The rear vehicle body structure is to improve the rigidity of the parts in and around the rear wheel apron while allowing the vehicle body to readily deform in the event of a rear impact collision, and to be capable of protecting fuel piping systems from the impact of collision.

To achieve the above object, the present invention provides a rear vehicle body structure of a pickup truck having a cargo bed, including a rear floor panel defining a horizontal plane of the cargo bed, a rear wheel apron disposed on a side of the rear floor panel, a fuel piping system accommodated in the rear wheel apron, parts of the fuel piping system being led out to a side of the cargo bed to be installed therealong, and a first reinforcing member jointed to the rear wheel apron for covering a vicinity of a portion of the rear wheel apron at which the part of the fuel piping system is led out to the side of the cargo bed, including a flange formed by bending a lower end portion of the first reinforcing member toward a center of the vehicle body. The rear floor panel and the rear wheel apron are jointed together, with a side edge portion of the rear floor panel being superposed upon the flange.

Another feature of the present invention is that the structure further includes a plate-like second reinforcing member jointed to the rear wheel apron ahead of and above the first reinforcing member, and a bracket having a luggage anchoring hook arranged between the first and second reinforcing members, with a lower end portion of the bracket being fastened to the first reinforcing member and an upper end portion thereof being fastened to the second reinforcing member.

Yet another feature of the present invention is that a lowermost edge of the second reinforcing member is positioned above an uppermost edge of the first reinforcing member.

BRIEF DESCRIPTION OF THE DRAWINGS

These and other objects and advantages of the present invention will become understood from the following description with reference to the accompanying drawings, wherein:

FIGS. 4(a) to 4(c) are cross-sectional views taken along the lines A—A, B—B, and C—C of FIG. 3, respectively, in the direction of the arrows.

DETAILED DESCRIPTION OF THE PREFERRED EMBODIMENTS

Figure 1:
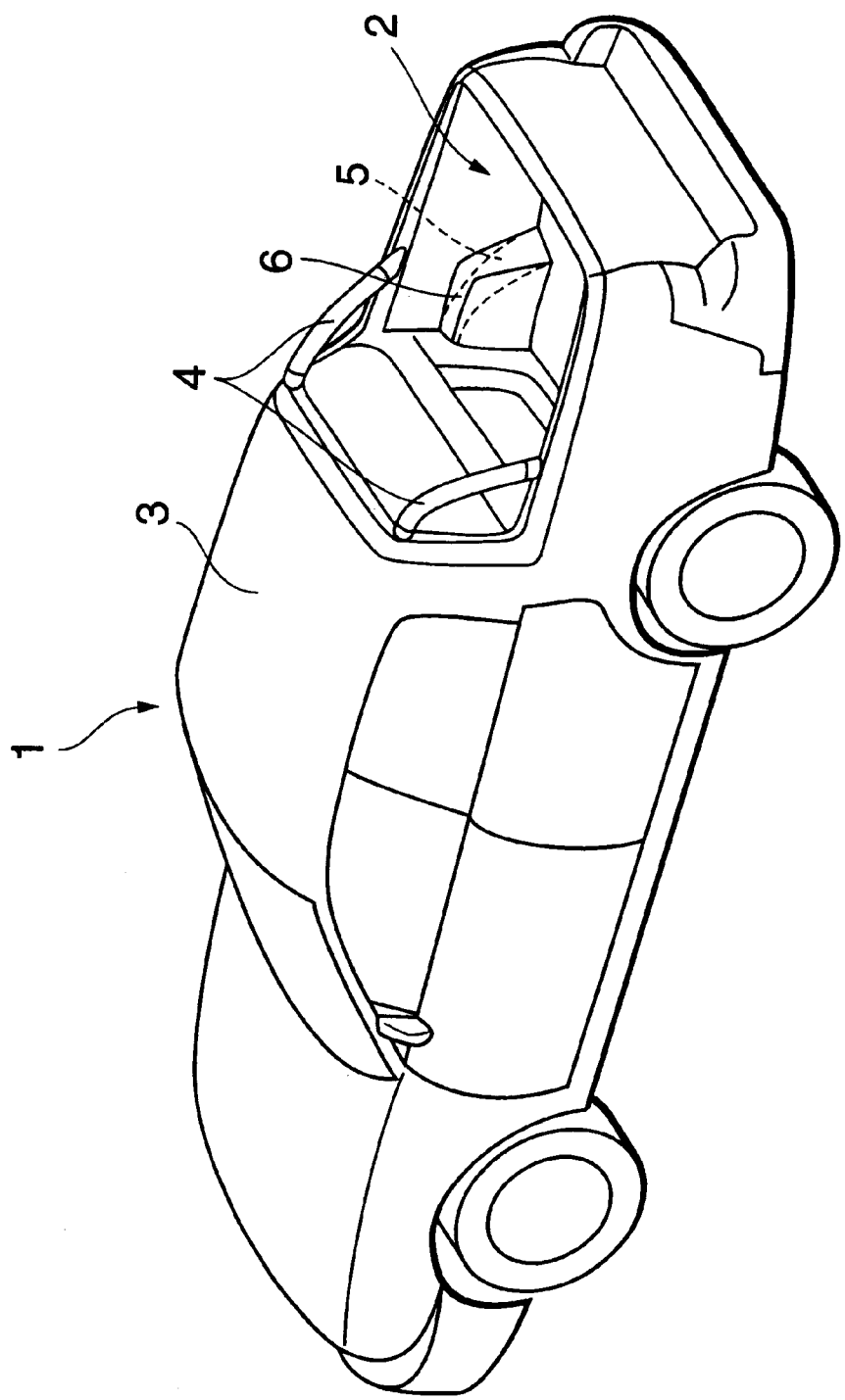
FIG. 1 is a perspective view of a pickup truck to which the present invention is applied, viewed from a rear side thereof.
Figure 2:
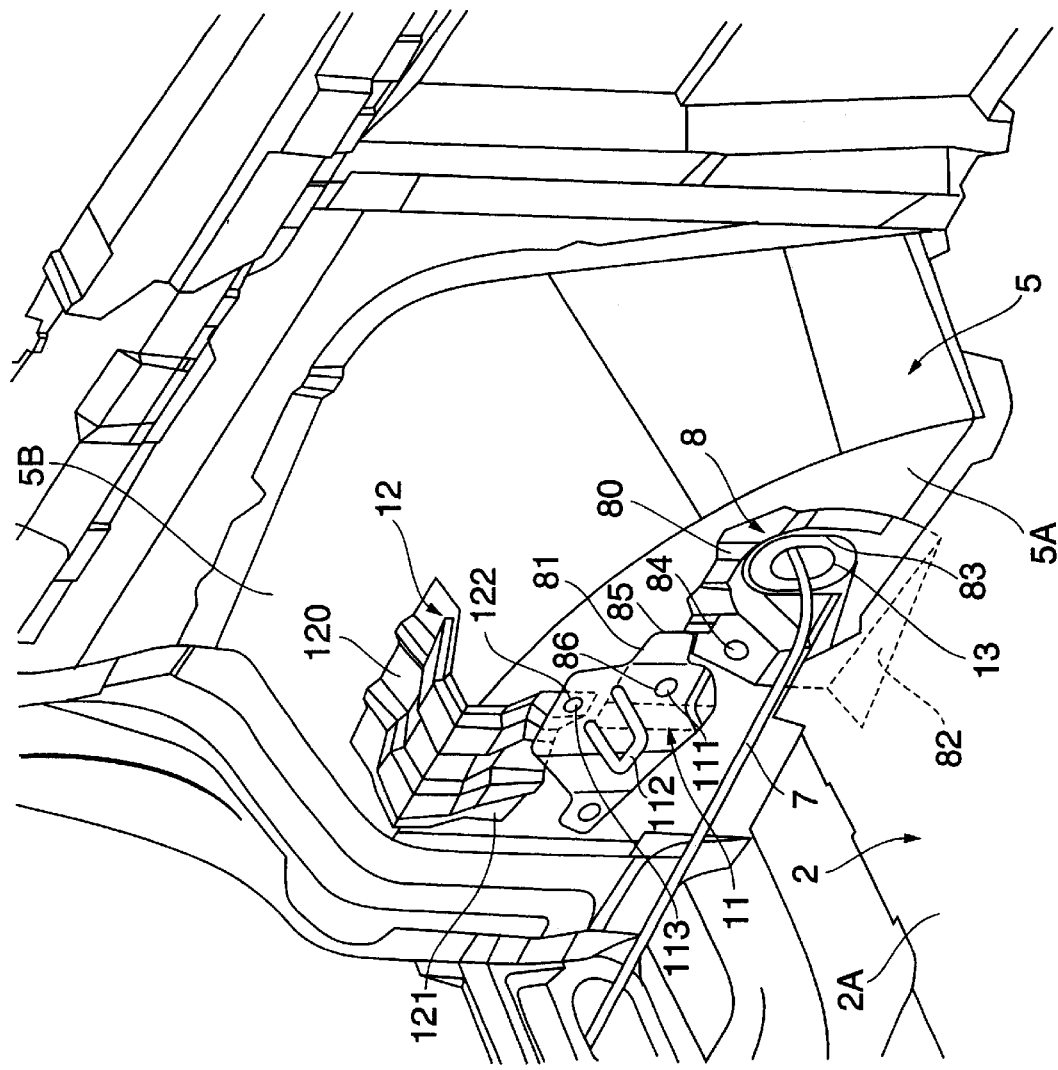
FIG. 2 is a perspective view schematically showing the right rear wheel apron of the pickup truck for explaining structures in the vicinity of the rear wheel apron.
Figure 3:
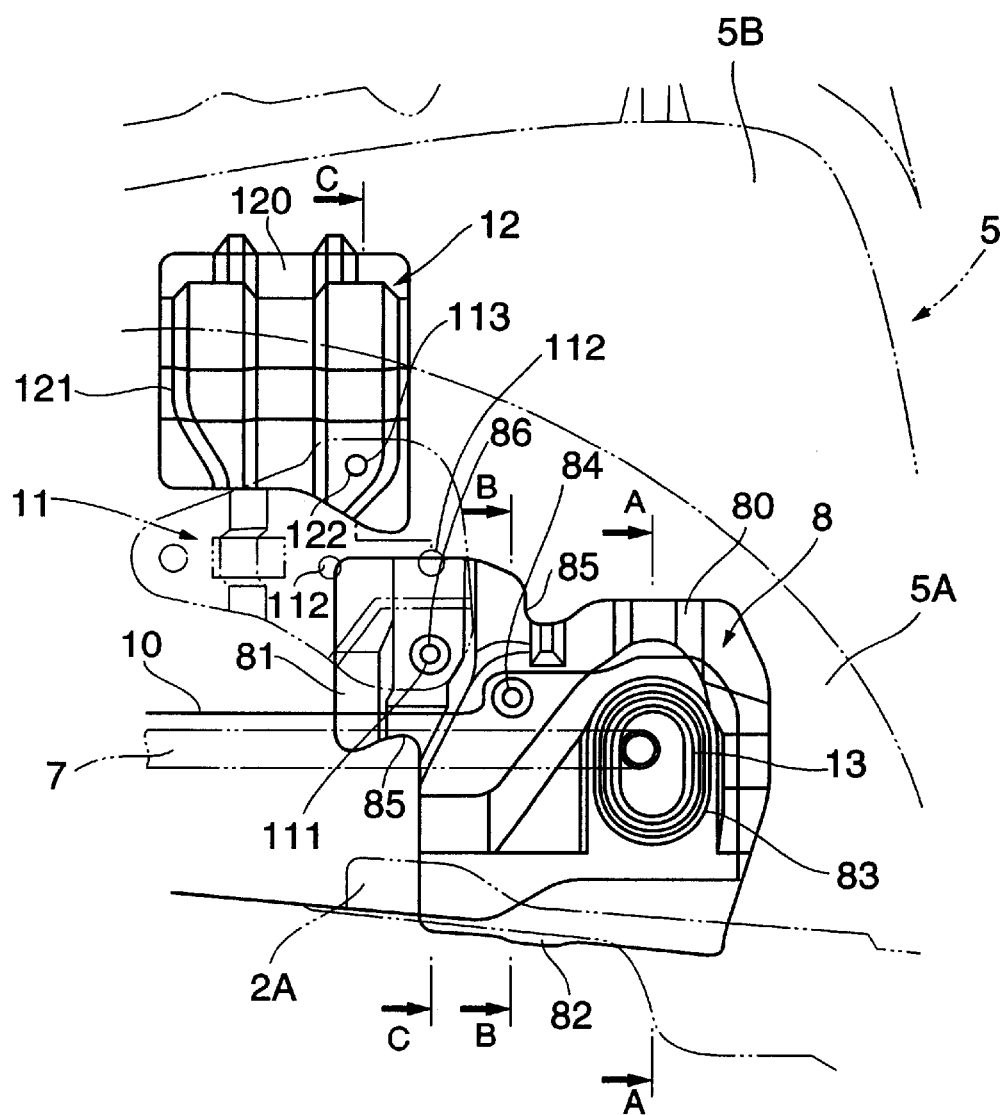
FIG. 3 is a side view schematically showing the rear wheel apron viewed from the center of a vehicle body, where upper and lower reinforcing members are mainly illustrated.

The preferred embodiment of a rear vehicle body structure for pickup trucks according to the present invention will be hereinafter described with reference to FIGS. 1 to 4(c). FIG. 1 is a perspective view of a pick-up to which the present invention is applied, viewed from a rear side thereof. FIG. 2 is a perspective view schematically showing a right rear wheel apron of the pick-up for explaining the structures in the vicinity of the rear wheel apron. FIG. 3 is a side view schematically showing the rear wheel apron viewed from the center of the vehicle body. FIGS. 4(a), 4(b), and 4(c) are cross-sectional views taken along the lines A—A, B—B, and C—C of FIG. 3, respectively, in the direction of the arrows.

The present invention is applied to a pick-up 1 as shown in FIG. 1, which is designed on the basis of such a car as a station wagon or a van; it has no roof over the rear compartment but an open cargo bed instead. The vehicle uses the same structures for the vicinity of the rear wheel apron and fuel piping systems accommodated therein with the cars on which the vehicle is based. In particular, as with the cars on the basis of which the vehicle is designed, the vehicle has an opening in either left- or right-hand quarter panel, a fuel filler pipe for guiding the fuel supplied from the opening into a fuel tank positioned below the vehicle floor, and an "On-board Refueling Vapor Recovery (ORVR)" pipe directed from one side of the rear wheel apron onto the cargo bed and further toward the front of the vehicle body.

As shown in FIG. 1, the pick-up 1 has a pair of diagonal guard bars 4 bridging across the top end of a cabin 3 and a front end of an open cargo bed 2. On both left and right sides of the open cargo bed 2 are the rear wheel aprons 5 bulged upwards toward the vehicle body center, conforming to a curved line of tires so that rear wheels and the vehicle body do not interfere with each other. The rear wheel aprons 5 are enclosed in respective covers 6.

FIGS. 2 to 4(c) illustrate one example in which the fuel piping system is disposed on the right side of the vehicle body. Between the rear wheel apron 5 and the cover 6 on the right side are arranged various parts such as an ORVR hose 7, a lower reinforcing member 8, an ORVR hose bracket 9, an ORVR hose cover 10, a luggage hook portion 11, and an upper reinforcing member 12. The ORVR hose 7 is installed in the fuel piping system for preventing fuel vapors from escaping into air during driving and refueling. It extends onto the cargo bed 2 through a circular grommet 13 fitted in a lower portion at the rear end of a vertical side wall 5A of the rear wheel apron 5, and is guided toward below the rear seats in the front body of the vehicle.

The lower reinforcing member 8 is a plate-like first reinforcing member and is bonded to the vertical side wall 5A of the rear wheel apron 5 in a predetermined position by welding. The first reinforcing member 8 is made up of a main part 80, a mounting portion 81, and a flange 82. The main part 80 is for reinforcing the vicinity of the grommet 13 which guides the ORVR hose 7 in the rear wheel apron 5 onto the cargo bed 2. The mounting portion 81 is a projection or an extension of the main part 80 protruding upwards from the front end of the main part 80 via a neck portion. One end of the luggage hook portion 11 to be described later is attached to the mounting portion 81. The flange 82 is formed by bending the lower edge of the main part 80 in horizontal direction, i.e., toward the vehicle body center.

The main part 80 and the mounting portion 81 of the lower reinforcing member 8 are formed with beads or the like on their entire surfaces to increase strength. An ellipse cutout or an elongated through hole 83 is formed substantially at the center of the main part 80 so as not to interfere with the grommet 13 in the rear wheel apron 5 (see FIG. 4(a)). The ORVR hose 7 penetrates through the hole 83. At the center of the main part 80 beside the through hole 83 is provided a bolt hole 84 with a predetermined diameter at a position toward the front of the vehicle body, i.e., on the side of the cabin 3. A welded bolt 14 is fitted to the bolt hole 84 and fastened thereto with a nut 15. The shaft of the welded bolt 14 passes through the bolt hole 84 from the backside of the hole 84 or from the side of the rear wheel apron 5 toward the vehicle body center. To the shaft of the welded bolt 14 are attached the upper end of the ORVR bracket 9 and the upper end of the ORVR hose cover 10 to be fastened by a nut 15. The ORVR bracket 9 extends a certain distance toward the vehicle body center to support the ORVR hose 7. The ORVR hose cover 10 extends forward to the rear direction of the vehicle for protecting the ORVR hose 7. The central portion of the main part 80, in which the welded bolt 14 is fitted, and the side wall 5A of the rear wheel apron 5 are spaced apart and not bonded together as can be seen from FIG. 4(b). The main part 80 has indentations in the outer circumferential edge to form the neck portion 85 at the foot of the mounting portion 81.

At the center of the mounting portion 81 of the lower reinforcing member 8 is provided a bolt hole 86 of a predetermined diameter. A welded bolt 16 is fitted to the bolt hole 86 and fastened thereto with a nut 17. The shaft of the welded bolt 16 passes through the bolt hole 86 from the backside of the hole 86 or from the side of the rear wheel apron 5 toward the vehicle body center. The shaft of the welded bolt 16 also passes through another bolt hole 111 of a predetermined diameter formed at the lower end of the luggage hook portion 11 to be described later, and then is fastened by the nut 17. The central portion of the mounting portion 81, in which the welded bolt 16 is fitted, and the side wall 5A of the rear wheel apron 5 are spaced apart and not bonded together as can be seen from FIG. 4(c).

One side edge of the rear floor panel 2A which defines the horizontal plane of the cargo bed 2 is bent upwards and superposed upon the flange 82 of the lower reinforcing member 8. In this state, the flange 82 of the lower reinforcing member 8 and a part of the rear floor panel 2A are bonded together at the predetermined location by welding. Also, the side wall 5A of the rear wheel apron 5, and the lower end portion of the main part 80 of the lower reinforcing member 8 and the side edge portion of the rear floor panel 2A, which are superposed and bonded upon the respective surfaces, are bonded together by welding at the predetermined location. Reference numeral 2B in FIGS. 4(a) to 4(c) represents a flange formed in the side edge of rear side frames arranged on both left and right sides of the vehicle body. The rear floor panel 2A is bonded on the upper face of the flange 2B.

The luggage hook portion 11 is a bracket disposed opposite and spaced from the side wall 5A of the rear wheel apron 5. The bolt hole 111 mentioned above having the predetermined diameter is formed in a lower end portion of the luggage hook portion 11. The welded bolt 16 passes through the bolt hole 111 and the bolt hole 86 in the mounting portion 81 of the lower reinforcing member 8, and is fastened thereto by the nut 17. In a vertically central portion of the luggage hook portion 11 is fixedly attached a hook 112 which is provided for anchoring luggage on the cargo bed. The hook 112 protrudes horizontally toward the vehicle body center when the luggage hook portion 11 is mounted along the side wall 5A of the rear wheel apron 5, and is substantially U-shape when viewed from above. The height position of the hook 112 corresponds approximately to the upper edge of the mounting portion 81 of the lower reinforcing member 8.

As shown in FIG. 2, in an upper end portion of the luggage hook portion 11 is provided another bolt hole 113 of a predetermined diameter, which is slightly offset from the lower bolt hole 111 toward the front of the vehicle body. This bolt hole 113 is for connecting the luggage hook portion 11 to the lower end of the upper reinforcing member 12 to be described later, by another welded bolt 18 passing therethrough and a nut 19 fixing the bolt thereto.

The luggage hook portion 11 is thus detachably mounted to the rear wheel apron 5, as the upper and lower end portions are respectively fastened to the upper and lower reinforcing members 12, 8 by bolts and nuts. The plate thickness of the luggage hook portion 11 is slightly larger than that of the side wall 5A of the rear wheel apron 5 or the upper and lower reinforcing members 12, 8.

The upper reinforcing member 12 is a plate-like second reinforcing member which is bent to bridge across the vertical side wall 5A and an upper curved face 5B of the rear wheel apron 5. The upper reinforcing member 12 is provided for increasing the strength of the rear wheel apron 5 so that the apron 5 can hold the weight of a member for dividing the cargo bed 2 into upper and lower sections. The upper reinforcing member 12 has a side face 121 and an upper face 120, which are respectively bonded to the side wall 5A and the upper curved face 5B of the rear wheel apron 5 by welding. The side face 121 and the upper face 120 are both provided with reinforcing beads formed side by side along the front to rear direction of the vehicle. In a lower end portion on the rear side of the side face 121 is formed a bolt hole 122 of a predetermined diameter, and the welded bolt 18 passes through this hole from the backside, i.e., from the side of the rear wheel apron 5 toward the vehicle body center to fasten the upper reinforcing member 12 and the luggage hook portion 11 together by the nut 19.

To sum up, the lower reinforcing member 8 is made up of the main part 80, the mounting portion 81, and the flange 82. The main part 80 is for reinforcing the vicinity of a portion of the rear wheel apron 5 at which the ORVR hose 7 is led out onto the cargo bed. The mounting portion 81 is formed at the upper front end of the main part 80 and connected to one end of the luggage hook portion 11. Also, the flange 82 is formed by bending the lower edge portion of the main part 80 in the horizontal direction. Further, the flange 82 of the lower reinforcing member 8 is jointed to the part of the rear floor panel 2A by welding. The side wall 5A of the rear wheel apron 5, and the lower end portion of the main part 80 and the side edge portion of the rear floor panel 2A, which are superposed and bonded upon the respective surfaces, are jointed together by welding. With this structure, the linking strength between the rear wheel apron 5 and the rear floor panel 2A is sufficiently secured, whereby the following effects are achieved: Noise and vibration are reduced to the level of cars on which the pick-up is based; and it provides a secure protection for the portion at the rear and lower end of the rear wheel apron 5, where the ORVR hose 7 are installed, and the surrounding area against the impact load of the collision from the front to rear direction, and prevents the installed area of the ORVR hose and the surrounding area from being deformed.

The mounting portion 81, to which the luggage hook portion 11 is mounted, extends upwards to the front from the main part 80 of the lower reinforcing member 8 via the neck portion 85. The central portion of the mounting portion 81 where the welded bolt 14 is fixed is spaced apart from the rear wheel apron 5. Therefore, should the luggage hook portion 11 mounted to the mounting portion 81 be subjected to high tension toward the vehicle body center, the central portion of the mounting portion 81 of the lower reinforcing member 8 can deform resiliently to absorb such tension. The adverse effects of the tension to the main part 80 are thus decreased, and the through hole 83 for the ORVR hose 7 and the surrounding area are prevented from being deformed due to such tension. The lower reinforcing member 8 can absorb also the impact in the collision by the deformation of the neck portion 85, and to some extent contribute to the prevention of deformation of the portion where the ORVR hose 7 passes and the surrounding area.

Even if the lower reinforcing member 8 is subjected to such a high tension that the mounting portion 81 could be removed from the rear wheel apron 5, the neck portion 85 will act as a buffer against that stress so that any such tension will only result in deformation of the mounting portion 81 alone and not affect to the main part 80. Thus the portions at the rear lower end of the rear wheel apron 5, where the ORVR hose 7 passes, and at the surrounding area are firmly protected.

The luggage hook portion 11 has two bolt holes 111, 113 in the upper and lower end portions such that the bolt holes are offset from each other in front to the rear direction of the vehicle body. The luggage hook portion 11 is indirectly mounted to the side wall 5A of the rear wheel apron 5 via the upper and lower reinforcing members 12, 8, and it is detachably fastened to the reinforcing members by the bolts and nuts.

Therefore, even if a force of the tension is exerted to the luggage hook portion 11 toward the vehicle body center, the central portion of the luggage hook portion 11 can slightly warp and absorb the tension, thereby decreasing the adverse effects of the tension to the rear wheel apron 5. Further, upon the rear wheel apron 5 receiving an impact load from the rear side of the vehicle, the luggage hook portion 11 can be displaced in turning motion around either one of the welded bolts 18, 16 at the upper and lower ends. Therefore, in the event of a rear impact collision, the luggage hook portion 11 does not impede the deforming action of the rear wheel apron 5 but smoothly follows the movement of the apron 5. In other words, the luggage hook portion 11 does not cause an increase in the stiffness of the vehicle body against a rear impact.

The upper reinforcing member 12 is fixedly bonded to the rear wheel apron 5 such that the upper reinforcing member 12 exhibits a higher counteracting force against the tension toward the vehicle body center, so that the downward load thereupon of a member for dividing the cargo bed 2 into upper and lower sections will be dispersed, without unnecessarily increasing the stiffness of the vehicle body in the front to rear direction. The tension exerted to the lower end of the upper reinforcing member 12 via the luggage hook portion 11 is therefore distributed to the side wall 5A and the upper curved face 5B of the rear wheel apron 5. Thus, the side wall 5A of the rear wheel apron 5 does not readily deform even if a strong pulling force is exerted to the luggage hook portion 11 toward the vehicle body center. The upper reinforcing member 12 also improves quietness of the running vehicle as it contributes to reduction in vibration around the rear wheel apron 5.

Accordingly, in the event of the rear impact collision, while the fuel piping system is protected from the impact load, the cargo bed 2 and the rear wheel apron 5 will be deformed smoothly so as not to cause much damage to the passengers.

As described above, the present invention provides a rear vehicle body structure for the pickup trucks which enables the linking strength between the rear wheel apron 5 and the cargo bed 2 of the vehicle to be increased, without adding any major change in the body design. Therefore, while the rigidity around the rear wheel apron 5 is improved, the structure does not inhibit the vehicle body from being deformed in the rear impact collision and is also capable of protecting the fuel piping system from the impact.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A rear vehicle body structure of a pickup truck having a cargo bed, comprising:
   a rear floor panel defining the cargo bed;
   a rear wheel apron disposed on a side of the rear floor panel;
   a fuel piping system passing through the rear wheel apron, part of the fuel piping system being led out toward the cargo bed; and
   a first reinforcing member jointed to said rear wheel apron for covering a vicinity of a portion of the rear wheel apron at which said part of the fuel piping system is led out to the side of the cargo bed, including a flange formed by bending a lower end portion of said first reinforcing member toward a center of the vehicle body,
   wherein said rear floor panel and said rear wheel apron are jointed together, with a side edge portion of the rear floor panel being superposed upon said flange.

2. The rear vehicle body structure according to claim 1, further comprising:
   a second reinforcing member jointed to the rear wheel apron above said first reinforcing member, and
   a bracket having a luggage anchoring hook arranged between said first reinforcing member and said second reinforcing member, with a lower end portion of the bracket being fastened to said first reinforcing member and an upper end portion thereof being fastened to said second reinforcing member.

3. The rear vehicle body structure according to claim 2, further comprising:
   a lowermost edge of said second reinforcing member positioned above an uppermost edge of said first reinforcing member.

4. The rear vehicle body structure according to claim 2, wherein said first reinforcing member further comprising:
   a head portion;
   a trunk portion having said flange at the lower end portion; and
   a neck portion having a small width, and positioned between the head portion and the trunk portion,
   wherein said head portion is detachably attached to said bracket.

5. The rear vehicle body structure according to claim 2, Wherein said bracket is spaced apart from said rear wheel apron without bonding together therewith, at places where said bracket is jointed with said first reinforcing member and said second reinforcing member, respectively.

6. The rear vehicle body structure according to claim 4, Wherein said bracket is spaced apart from said rear wheel apron without bonding together therewith, at places where said bracket is jointed with said first reinforcing member and said second reinforcing member, respectively.

* * * * *